United States Patent
Bedingfield, Sr.

(10) Patent No.: US 7,895,157 B2
(45) Date of Patent: Feb. 22, 2011

(54) METHODS, SYSTEMS AND COMPUTER PROGRAM PRODUCTS FOR PLAYING BACK PREVIOUSLY PUBLISHED CONTENT

(75) Inventor: James Carlton Bedingfield, Sr., Lilburn, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 492 days.

(21) Appl. No.: 11/942,204

(22) Filed: Nov. 19, 2007

(65) Prior Publication Data

US 2009/0132610 A1    May 21, 2009

(51) Int. Cl.
*G06F 17/30* (2006.01)
(52) U.S. Cl. ........................ 707/627; 707/796
(58) Field of Classification Search ................. 707/203, 707/796, 627
See application file for complete search history.

(56) References Cited

U.S. PATENT DOCUMENTS 7,461,099 B1 * 12/2008 Sharpe et al. ...................... 1/1
2008/0008458 A1 * 1/2008 Gudipaty et al. ............ 386/131
2008/0112690 A1 * 5/2008 Shahraray et al. ........... 386/124
2009/0007198 A1 * 1/2009 Lavender et al. .............. 725/91

OTHER PUBLICATIONS

U.S. Appl. No. 11/953,316, filed Dec. 10, 2007, Bedingfield.

* cited by examiner

*Primary Examiner*—Jean B. Fleurantin
*Assistant Examiner*—Dennis Myint
(74) *Attorney, Agent, or Firm*—Myers Bigel Sibley & Sajovec, P.A.

(57) ABSTRACT

Previously published content is played back by identifying a previous time in which the previously published content was previously published and automatically adding an indication of the previous time in which the content was previously published, while playing back the previously published content. The indication may include a timestamp of the previous time, ambience and/or historical context of the previous time, an electronic program guide for the previous time, a current events guide for the previous time and/or archived content for the previous time that is related to the user of the content. Related systems, methods, computer program products and content playback devices are described.

7 Claims, 7 Drawing Sheets

METHODS, SYSTEMS AND COMPUTER PROGRAM PRODUCTS FOR PLAYING BACK PREVIOUSLY PUBLISHED CONTENT

BACKGROUND

This invention relates to electronic devices and operating methods and computer program products therefor and, more particularly, to content players and operating methods and computer program products therefor.

Content players are widely used to play content from various sources. As used herein, the term "content" includes multimedia (i.e., audio, static images and/or video) content, such as movies, television programs, sound recordings, Web pages, photographs and/or images of newspapers, books, magazines, etc. Content players may be portable, transportable or fixed in location, and may be dedicated or multipurpose devices. Content players may include televisions, home theater systems, set top boxes, desktop computers, notebook computers and wireless devices, such as cell phones and/or personal digital assistants. Content players may play back content that is received wirelessly and/or over wired networks, such as cable networks or the Internet, and/or may play back content that was stored in a content storage device, such as a DVD player and/or a digital video recorder. Moreover, the functionality of a content player and a content storage device may be integrated at least in part.

In modern society, users are increasingly interested in playing content from many different sources on many different content players at various geographic locations. Some of this content may be "live", i.e., content that is played simultaneous with its broadcast. Examples of live content may include current news broadcasts, current television programs or current sporting events. Other content may be classified as "previously published" content, in that the content was created and distributed (broadcast) earlier, stored and then played back at a later time. Examples of previously published content include broadcast television programs that are recorded in a digital video recorder and played back later, rebroadcasts of old news broadcasts, old television programs or old sporting events, podcasts and/or playing of old movies that were previously shown in theaters and are presently distributed using DVDs and/or other distribution media.

SUMMARY

Some embodiments provide methods of playing back previously published content by identifying a previous time in which the previously published content was previously published and automatically adding an indication of the previous time in which the content was previously published, while playing back the previously published content. An indication that the content was previously published and is currently being played back can provide a context for the previously published content, and can reduce or eliminate user confusion as to whether the content is live content or previously published content.

In some embodiments, the previously published content is visual content and the previously published visual content is surrounded by a frame that indicates the previous time in which the visual content was previously published. In other embodiments, the previously published visual content is overlayed with an overlay that indicates the previous time in which the visual content was previously published.

Many embodiments of providing an indication of a previous time in which the content was previously published may be provided. In some embodiments, a timestamp of the previous time in which the content was previously published may be added. In other embodiments, ambience and/or historical context of the previous time may be added. In still other embodiments, an electronic program guide for the previous time may be added, so that other content sources from the previous time may be accessed. In still other embodiments, a current events guide for the previous time may be added. In still other embodiments, archived content for the previous time that is related to a user that is playing back the previously published content may be added. The indication of a previous time may also provide an indication of a geographic location, for example of the user of the content playback device and/or of the previously published content. Moreover, in other embodiments, the indication of a previous time may vary depending upon the age of the content, for example by adding a first type of indication if the previous time is before a given time and adding a second type of indication if the previous time is after the given time. In some embodiments, the content is played back and the indication of a previous time is automatically added, using a single playback device. In other embodiments, however, two different playback devices may be used. Thus, for example, the previously published content may be played back on a first playback device, whereas the indication of a previous time in which the content was previously published may be provided on a second playback device, while playing back the previously published content on the first playback device.

It will be understood that embodiments have been described above in connection with methods of playing back previously published content. However, analogous systems, devices (content players), user interfaces, and/or computer program products for displaying content may also be provided according to any of the above-described embodiments. Moreover, any and all combinations and subcombinations of the herein-described embodiments may be provided according to other embodiments.

Computer program products according to other embodiments include computer-readable program code that is configured to play back previously published content on a content player. Computer-readable program code also is provided that is configured to identify a previous time in which the previously published content was previously published. Finally, computer-readable program code is provided that is configured to automatically add an indication of the previous time in which the content was previously published, while playing back the previously published content on the content player. The computer-readable program code may identify the previous time in which the previously published content was previously published by obtaining metadata for the previously published content and/or using other techniques. Moreover, the indication of the previous time for the previously published content may be provided according to any of the above-described embodiments. Analogous methods, systems, devices (content players) and/or user interfaces may also be provided using any combination or subcombination of the embodiments described herein.

Still other embodiments provide a user interface for playing back content. The user interface includes a first display portion that is configured to display therein content that was previously published. A second display portion is configured to display therein an indication of a previous time in which the content that is displayed on the first display portion was previously published. The second display portion may frame the first display portion and/or overlay the first display portion. Moreover, related systems, methods, devices (content players) and/or computer program products for providing the user interface may be provided according to other embodiments, and any or all of the herein-described embodiments may be used as part of the first and/or second display portions.

Other systems, methods, and/or computer program products according to other embodiments will be or become apparent to one with skill in the art upon review of the following drawings and detailed description. It is intended that all such additional systems, devices, methods, and/or computer program products be included within this description, be within the scope of the present invention, and be protected by the accompanying claims.

DETAILED DESCRIPTION

Exemplary embodiments now will be described more fully hereinafter with reference to the accompanying figures, in which embodiments are shown. There may be alternate embodiments in many alternate forms, and the embodiments described herein should not be construed as limiting.

Accordingly, while exemplary embodiments are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including", and variants thereof, when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, and variants thereof, it can be directly responsive to the other element, or intervening elements may be present. In contrast, when an element is referred to as being "directly responsive" to another element, and variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the exemplary embodiments may be embodied in hardware and/or in software (including firmware, resident software, micro-code, etc.). Furthermore, the exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, in certain embodiments, such as object oriented programming embodiments, the sequential nature of the flowcharts may be replaced with an object model such that operations and/or functions may be performed in parallel or sequentially.

Figure 1:
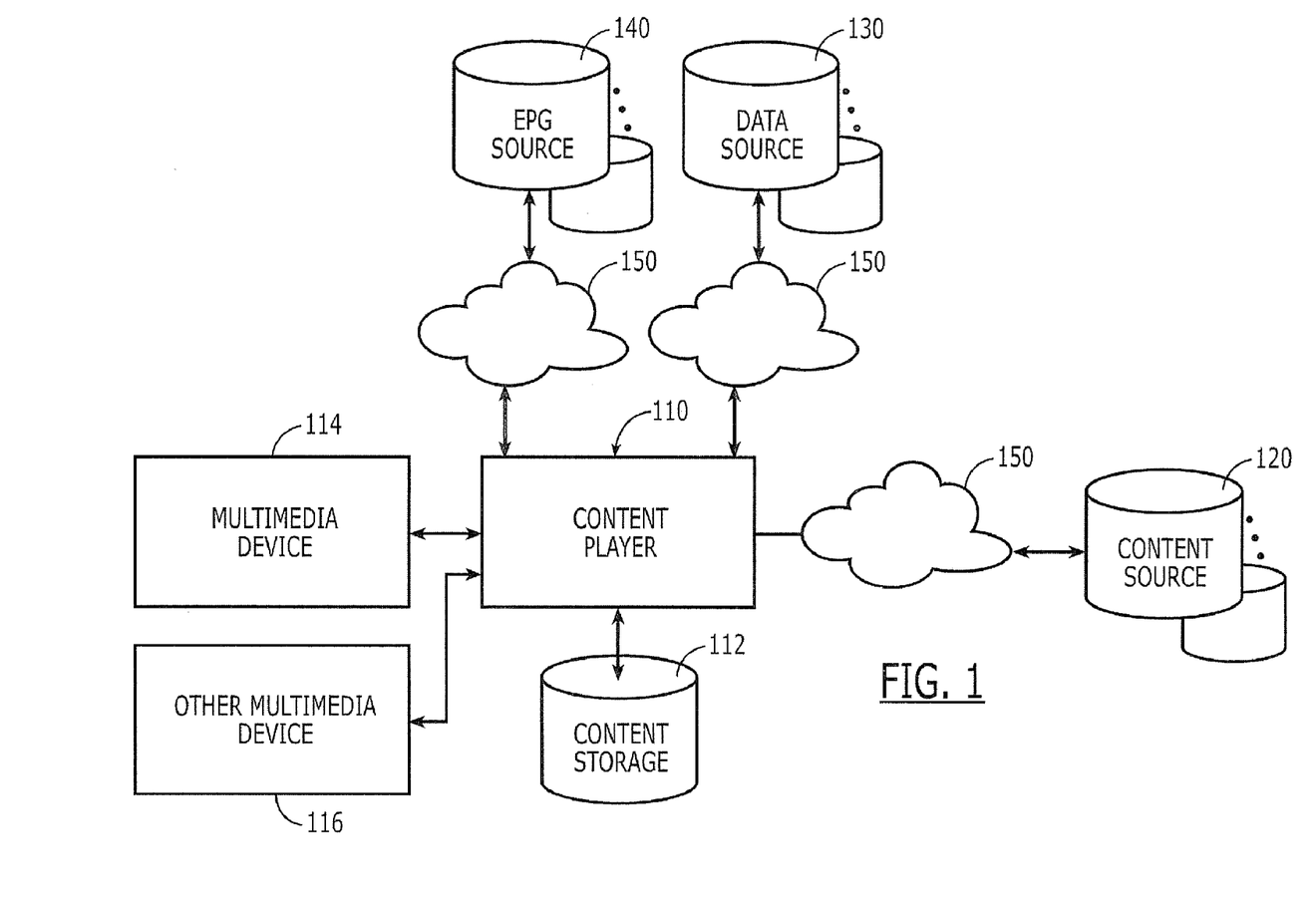
FIG. 1 is a block diagram of systems, devices, methods and/or computer program products for playing back previously published content according to various embodiments.

FIG. 1 is a block diagram of systems, devices, methods and/or computer program products for playing back previously published content according to various embodiments. As shown in FIG. 1, a content player 110 is provided. The content player 110, also referred to as a media player, may include content storage 112 and a multimedia device 114 associated therewith. The content player may include, for example, a standalone television, a home theater system, a set top box, a desktop, notebook or personal computer, a dedicated media player, a wireless terminal, such as a cell phone, a game player and/or any other device that can play received content. The content player 110 may be single purpose (dedicated) device or may be a general purpose or multipurpose device that also includes content playing functionality. Content storage 112 may be included in the content player 110, for example, using solid state, magnetic and/or optical memory, and/or may be separate from the content player 110. Content storage 112 may be embodied by a DVD player, a videocassette recorder, a digital video recorder such as a TiVo device, etc. The multimedia device 114 may include a video display and/or an audio reproduction device, and may also be contained within the content player 110, such as is often the case with a notebook computer, a portable device or a wireless device, or may be separate from the content player 110, as is often the case for desktop computers or home theater systems. Another multimedia device 116 may also be provided for separate but simultaneous display of the automatically added indication of a previous time in which the content was previously published, as will be described in detail below. Those skilled in the art will appreciate the design and operation of content players 110 including content storage devices 112 and multimedia devices 114/116, as described in this paragraph, such that no further description is needed herein.

Still referring to FIG. 1, the content player 110 may be connected to one or more content sources 120. The connection may be direct and/or via one or more wired and/or wireless, public and/or private networks 150, including the Internet. The content source(s) 120 may be, for example, a broadcast television source, a cable television source, an Internet Protocol Television (IPTV) source, a music server, a web server and/or other content source. Additional data sources 130 also may be connected to the content player 110, either directly and/or via a network 150. These additional data sources may provide access to archived content, personal content related to the user of the content player 110 and/or other media, such as newspapers and magazines, as will be described in detail below. These additional data sources 130 may include archived Really Simple Syndication (RSS) feeds, archived data such as news, personal calendars, personal media (photos, videos, email and/or voice mail) and/or other media, such as music, newspaper and magazines, as will be described in detail below. Finally, one or more Electronic Program Guide (EPG) sources 140 may provide a guide for and access to other content that was broadcast by a given source or sources at a given time, and may be used by the content player 110, as will be described in detail below. Those skilled in the art will appreciate and understand the overall design and operation of EPGs, such that no further description is needed herein. The EPG sources 140 may be connected to the content player directly and/or via a network 150.

Figure 2:
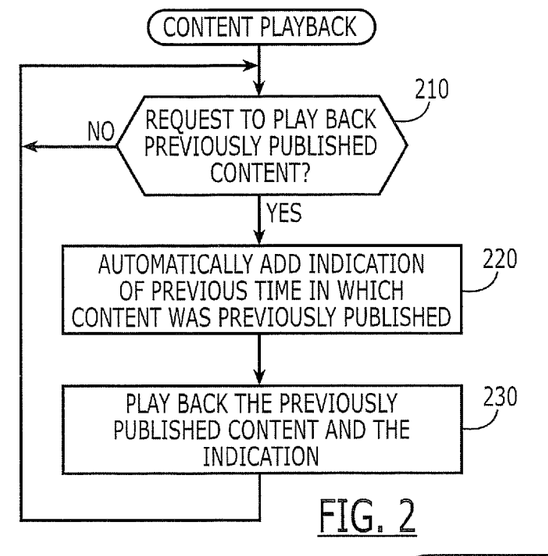
FIGS. 2-6 are flowcharts of operations that may be performed to play back previously published content according to various embodiments.

FIG. 2 is a flowchart of operations that may be performed to play back previously published content according to various embodiments. These operations may be performed, for example, by the content player 110 of FIG. 1, using the content storage 112, content sources 120, data sources 130, EPG sources 140 and/or the multimedia device 114. These embodiments can provide for automatically adding an indication of a previous time in which the content was previously published while playing back the previously published content.

More specifically, referring to FIG. 2, at Block 210, a user request to play back previously published content may be obtained at the content player 110. The request to play back previously published content may be embodied in many forms, ranging from simple to complex. For example, the user may simply tune to a given channel on a television, which is broadcasting previously broadcast television programs, movies and/or news events. In other embodiments, a content storage device, such as a digital video recorder, may be accessed and instructed to play a given content that was already stored. In other embodiments, the Internet or an electronic program guide may be accessed and a user selection may be made to play back previously published content.

In response, at Block 220, an indication of the previous time in which the content was previously published is automatically added by the content player 110. Many different embodiments for obtaining the indication of the previous time in which the content was previously published and for automatically adding the indication of a previous time in which the content was previously published may be provided according to various embodiments, as will be described in detail below. Finally, at Block 230, the previously published content is played back along with the indication of the previous time in which the content was previously published. Playback may continue until a new request is made at Block 210, the content ends or until the content player 110 is turned off. Moreover, in other embodiments, the automatic adding of the indication at Block 220 may be a user selectable function of the content player 110, so that the indication of the previous time is only automatically added based on user enablement of this function.

Figure 3:
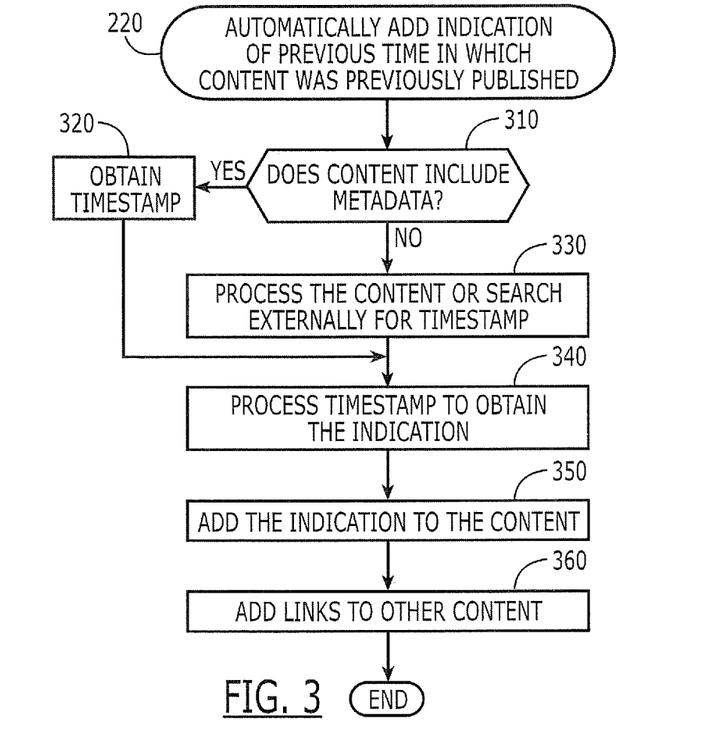

FIG. 3 is a flowchart of operations that may be performed to automatically add an indication of a previous time in which the content was previously published, according to various embodiments, which may generally correspond to Block 220 of FIG. 2. Referring to FIG. 3, a determination is made at Block 310 as to whether the content includes metadata. As those having skill in the art will recognize and appreciate, metadata generally refers to other information about the data itself, and may include information such as source, time of initial publication, length, format, etc. Newly published content increasingly is published with metadata, and metadata is increasingly being added to archived content, as is well known to those having skill in the art. Much content, such as content broadcast over the Internet, may include metadata. Additionally, cable or direct broadcast satellite television programs may also include metadata for use by a set top box. If the metadata includes a timestamp, then this timestamp may be obtained at Block 320. It will understood by those having skill in the art that the timestamp provides an identification of a time of earlier publication, which may correspond to a time of creation, and may be in the format of, for example, year, month/year, day/month/year or time of day/day/month/year.

Referring again to FIG. 3, if the content does not include metadata at Block 310, or the metadata does not include a timestamp, then a time of first publication may be obtained by performing further processing and/or searching. In particular, at Block 330, the content may be processed, for example by performing voice recognition and/or optical character recognition to decode a date that may be included within the content itself. Alternatively, a search may be performed, for example of the Internet, to obtain a previous time in which the content was previously published. Other techniques for searching externally for a timestamp for previously published content may be used. Reference is made to copending application Ser. No. 11/953,316, filed Dec. 10, 2007 to the present inventor, entitled Systems, Methods and Computer Products for Content-Derived Metadata, assigned to the assignee of the present application.

Referring now to Block 340, the timestamp may then be processed to obtain a desired indication using techniques that will be described in more detail below. The indication is then added to the content at Block 350 and displayed during playback of the previously published content. Finally, referring to Block 360, in other embodiments, links to other content may be added. These links may link to other content that was published during the previous time in which the content that is being played back was previously published. As will be described in more detail below, links to news events, weather, other similar content and/or other links may be provided. These links may provide an ambience and/or historical context for the previous time in which the content was previously published, while playing back the previously published content.

Figure 4:
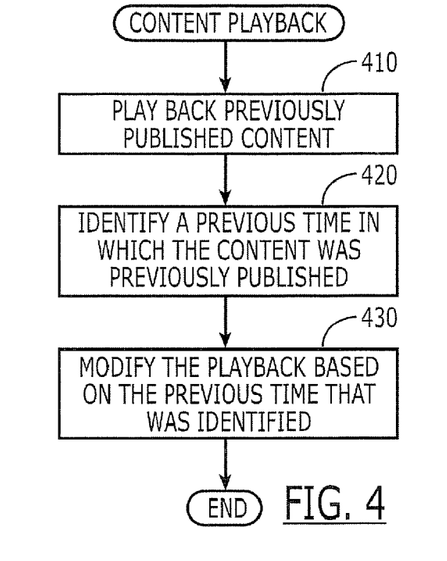

FIG. 4 is a flowchart of operations that may be performed to provide methods, systems, computer program products, user interfaces and/or devices for playing back previously published content according to various other embodiments. Referring now to FIG. 4, at Block 410, a playback of previously published content is performed. At Block 420, a previous time in which the previously published content was previously published is identified, for example, by accessing metadata and/or by performing external searching, as was described above. Finally, at Block 430, the playback of the previously published content on the contact playback device is modified based upon the previous time that was identified.

Figure 5:
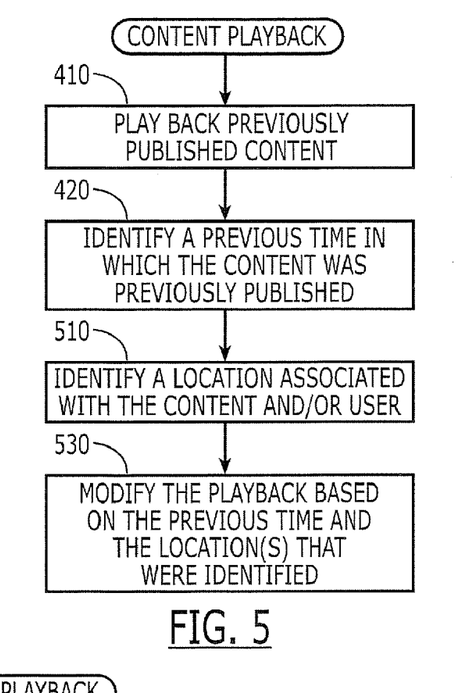

FIG. 5 is a flowchart of yet other operations that may be performed according to yet other embodiments. Referring now to FIG. 5, in addition to the operations at Blocks 410 and 420, a location that is associated with the content and/or a location that is associated with a user of the content player 110 may also be obtained at Block 510. The location may be obtained using metadata that is associated with the content, an address that is associated with the content player 110 and/or by external searching, similar to techniques that were described above. Finally, at Block 530, the playback is modified based on the previous time and the location(s) that were identified. Thus, the modification may be dependent upon a location, as well as time. Various examples will be provided below.

Figure 6:
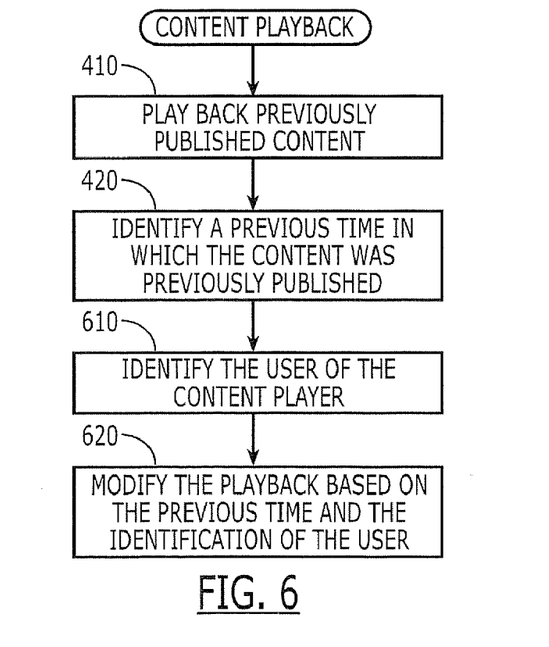

FIG. 6 is a flowchart of still other operations that may be performed to play back content according to still other embodiments. In particular, operations at Blocks 410 and 420 are performed as was described above. Moreover, at Block 610, the user of the content player 110 is identified, and user-specific information may be obtained. Then, at Block 620, the playback is modified based on the previous time and the identification of the user. Thus, the playback of previously published content may be accompanied by a user's personal calendar for the given time, photographs that are archived and are timestamped with the given time and/or other items that provide a user a context into the user's life at the time the content was previously published. Various examples will be provided below.

Embodiments of FIGS. 2-6 have been described in connection with playing back the previously published content and the indication in a single multimedia device. However, in other embodiments, the content may be played back using a first multimedia device 114 and the indication may be provided using the second multimedia device 116. For example, the indication of a previous time may be provided over an information channel that is associated with the primary playback channel. Thus, the indication of a previous time in which the content was previously published may be displayed as part of the station or song information that is broadcast by radio stations, and displayed on a display that is associated with a radio or a car navigation system. In other embodiments, the indication of a previous time may be provided to a personal computer or other multimedia device 116 simultaneously with the user's consuming the previously broadcast content on the primary device 114. By providing two separate devices, issues of allocating space on the primary multimedia device 114 may be reduced or eliminated. These embodiments may also allow for the display of audio related material on a television or other display, while the user was listening to an audio program on a stereo.

FIGS. 7-14 illustrate user interfaces that may be employed for playing back content according to various embodiments. These user interfaces may be displayed on a multimedia device 114 of FIG. 1, and may be generated using operations of FIGS. 2-6 according to various embodiments. In general, these user interfaces include a first display portion that is configured to display therein content that was previously published, and a second display portion that is configured to display therein an indication of a previous time in which the content that is displayed on the first display portion was previously published.

Figure 7:
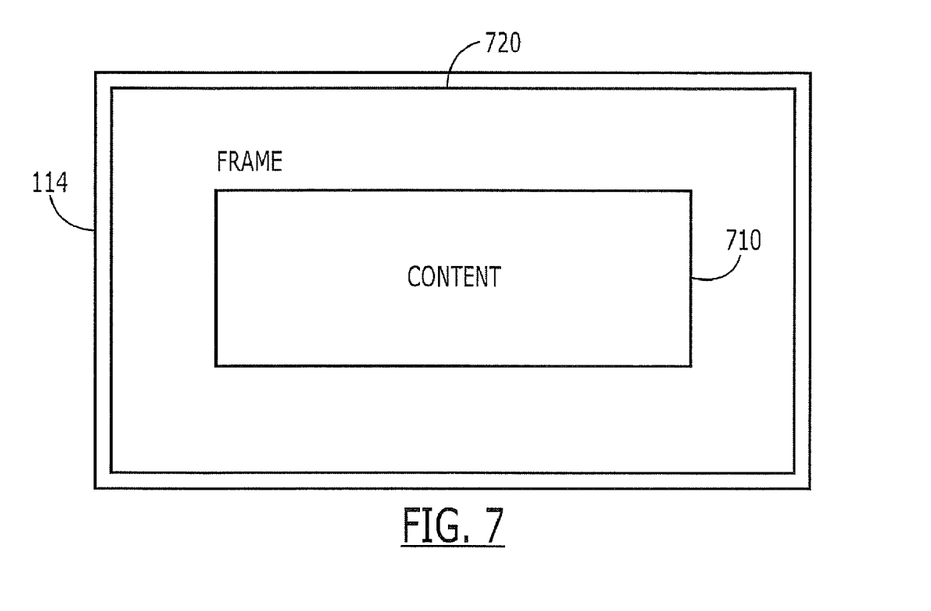
FIGS. 7-14 illustrate user interfaces for playing back content according to various embodiments.

For example, referring to FIG. 7, the content 710 may be displayed in a central portion of the display, and a frame 720 may at least partially surround the content 710. An indication of the previous time in which the content 710 that is displayed on the central portion of the display that was previously published may be provided in the frame 720. As used herein, a frame also includes a window, as is commonly employed in television broadcasting and computer displays. The frame 720 may give an indication in many ways. For example, the frame may provide a background that is indicative on an era in which the previous content was displayed, thereby adding ambience to the content. Thus, if the content is from the 1960s, a psychedelic background may be provided in the frame 720, whereas if the content is from the 1950s, a "malt shop" theme may be displayed. Other backgrounds that automatically add ambience may be envisioned by those having skill in the art. The background can provide an indication to the viewer that the content 710 is not current content, but, rather, is previously broadcast content from a different era. The user may therefore be better equipped to interpret the content, knowing that it is from another era.

Figure 8:
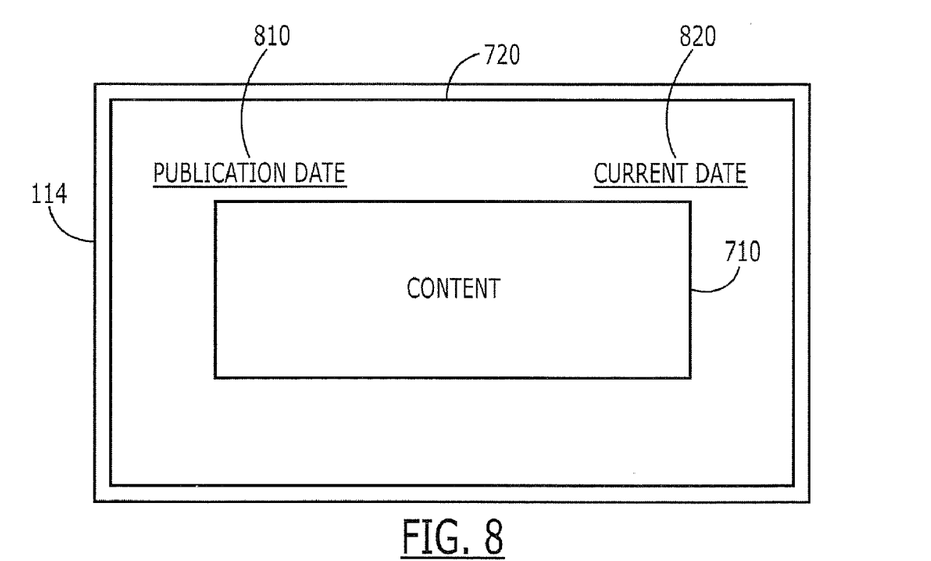
Figure 9:
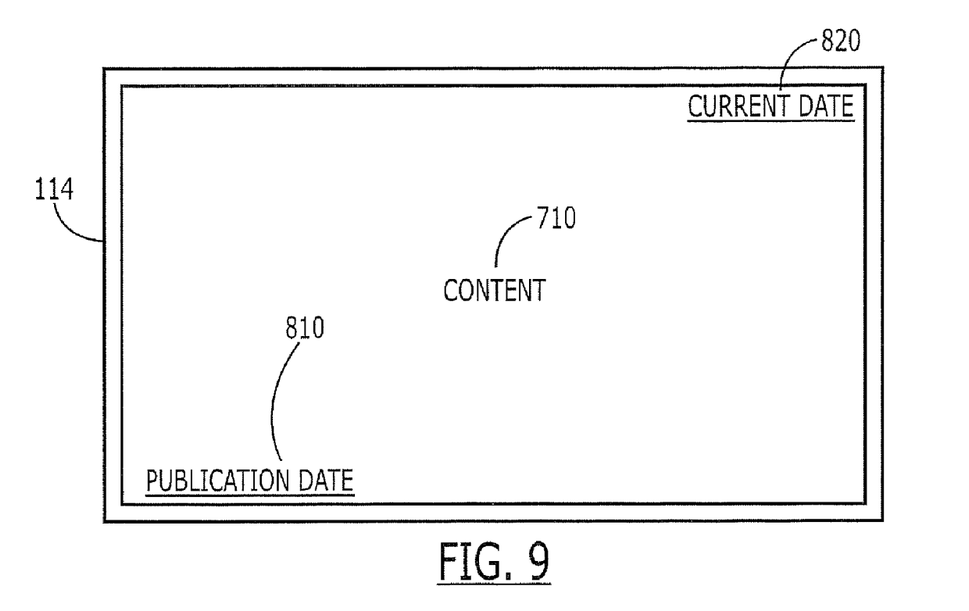

FIG. 8 illustrates other embodiments wherein the frame 720 includes an indication of the publication date 810 of the content 710 that is being displayed. The publication date 810 may be displayed in various formats that may be uniform or that may vary based upon the age of the content. For example, if the content is several years old, the publication date 810 may only include a year. Alternatively, if the publication is within the year, the publication date 810 may include the month and year. In another alternative, if the publication is more current, for example within the week, the publication date 810 may include the actual publication date, an indication such as "four days ago" and/or another indication indicating the publication time of the previously published content. Many other formats may be used. Moreover, a current date 820 may also be displayed in the frame 720, the format of which may be uniform or may vary depending upon the format in which the publication date 810 is displayed. Accordingly, when viewing older content, the user may see a timestamp of the previous time in which the content was previously published.

Embodiments of FIGS. 7 and 8 use a frame that indicates the previous time in which the visual content was previously published, while displaying the previously published content. In contrast, embodiments of FIG. 9 may include a transparent, translucent and/or opaque overlay including a publication date 810 that may also include a current date 820, as was described in connection with FIG. 8. Overlays are widely used in television broadcasts and computer software, and many formats of overlays are understood by those having skill in the art. Moreover, the indication of the previous time and/or other indications may combine a frame and an overlay.

Figure 10:
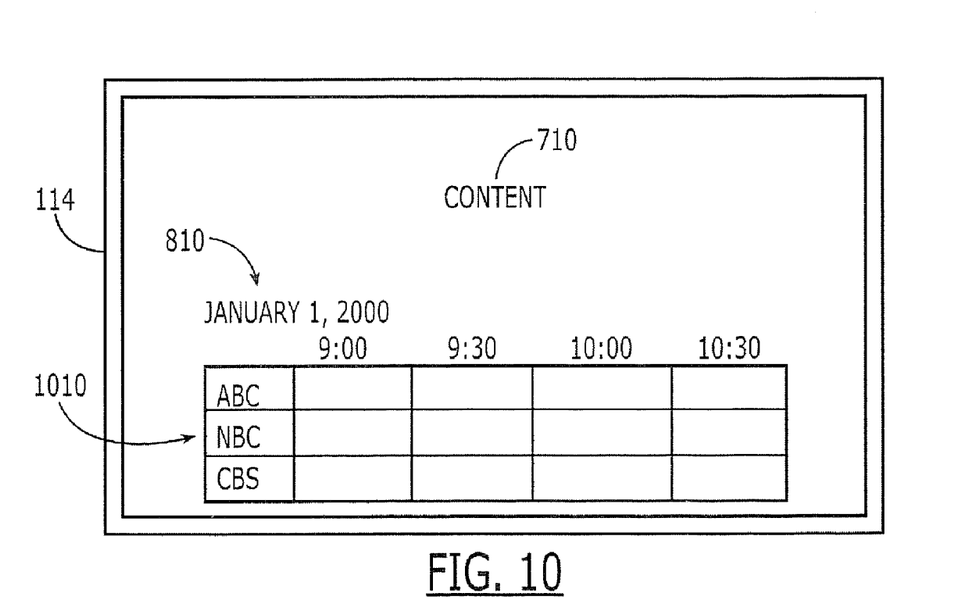

FIG. 10 illustrates other embodiments wherein, in addition to providing an indication of the date 810 on which the content was previously published, access to an Electronic Program Guide (EPG) 1010 also is provided, corresponding to the publication date 810. EPG 1010 may include a listing of the broadcasting stations (e.g., ABC, NBC, CBS), a listing of times (e.g., 9:00 . . . 10:30), and an indication of the program titles that are being broadcast. The EPG may be obtained from an EPG source 140 of FIG. 1 that archives EPGs. Other available programs from the given era may be accessed by navigating the EPG 1010. Accordingly, a user may be given a historical context of the previous time by allowing access to an EPG 1010 corresponding to the previous time in which the content was previously published. The EPG 1010 may be provided in a frame, window and/or overlay.

Figure 11:
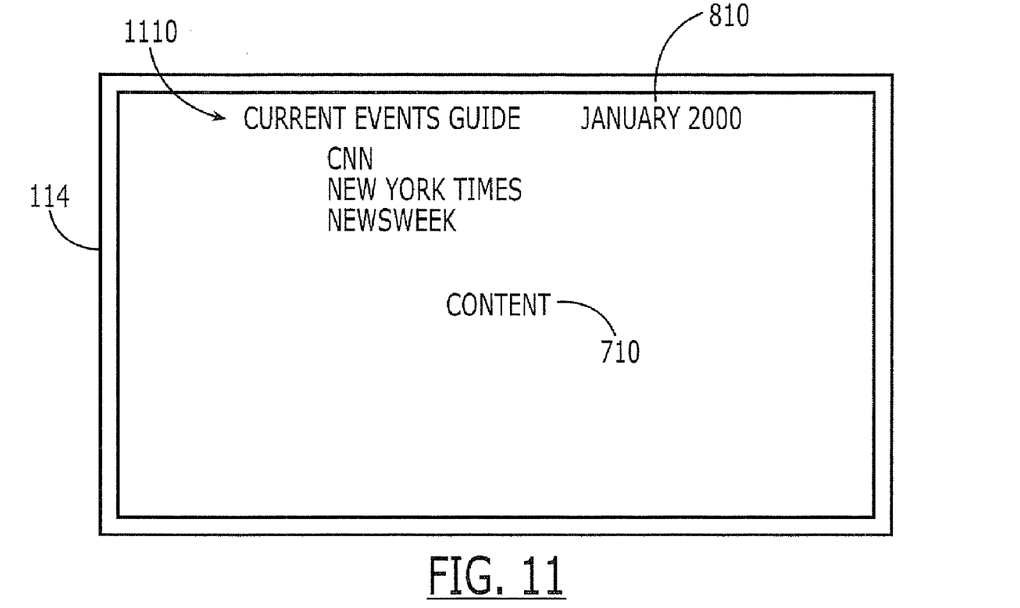

FIG. 11 illustrates other embodiments that add a current events guide 1110 for the previous time while playing back the previously published content 710. The current events guide 1110 may be obtained by searching various data sources 130, such as archived news, newspapers, magazines, etc., for content of interest at the previous time 810. The current events guide can also provide a context to the user, to aid the user in understanding or appreciating the previously published content. Again, the indication of the previous time 810 and the current events guide 1110 may be provided as an overlay, frame and/or window. The EPG 1010 and/or the current events guide 1110 may also be provided by a given media provider rather than for all media providers. Thus, for example, the EPG 1010 may only list CNN broadcasts for a given time, and the current events guide 1110 may only list Newsweek magazine articles related to the given time. Accordingly, a rich user interface may be provided by a given media provider for consumers of content.

Figure 12:
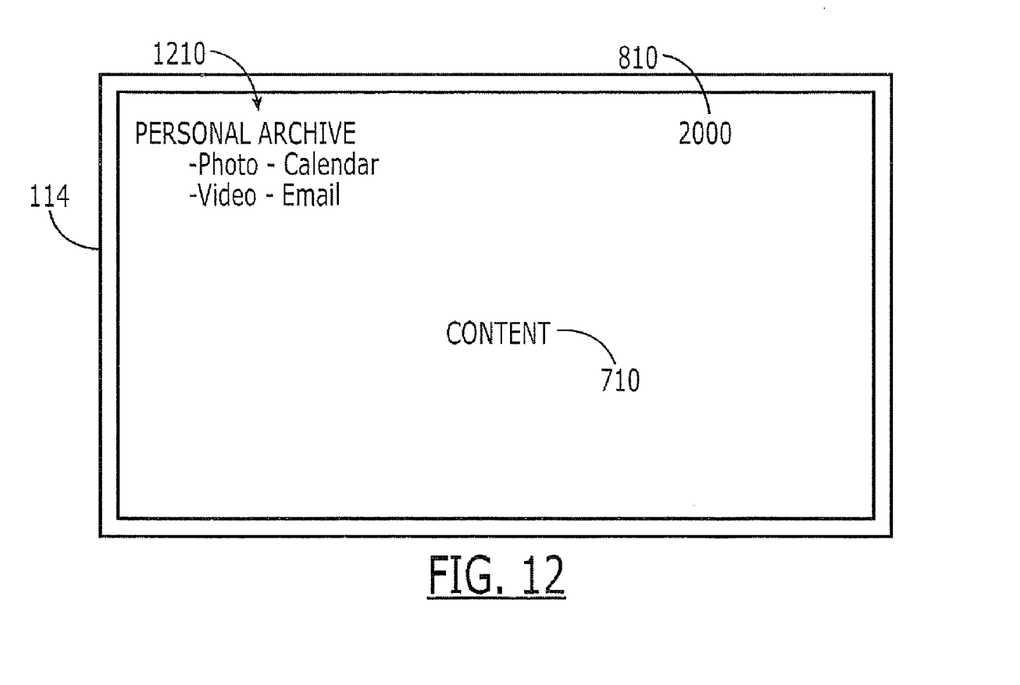

FIG. 12 illustrates other embodiments wherein archived personal content 1210 is added. In particular, archived personal content 1210 for the previous time 810 that is related to a user who is playing back the previously published content 710 is added as a frame, window and/or overlay. The archived personal content 1210 may include photographs, a user's calendar, videos, emails and/or other archived personal content related to the previous time in which the content 710 was previously published. Thus, the user may obtain a personal context as to events that were occurring in the user's life at the time the content was previously published.

Figure 13:
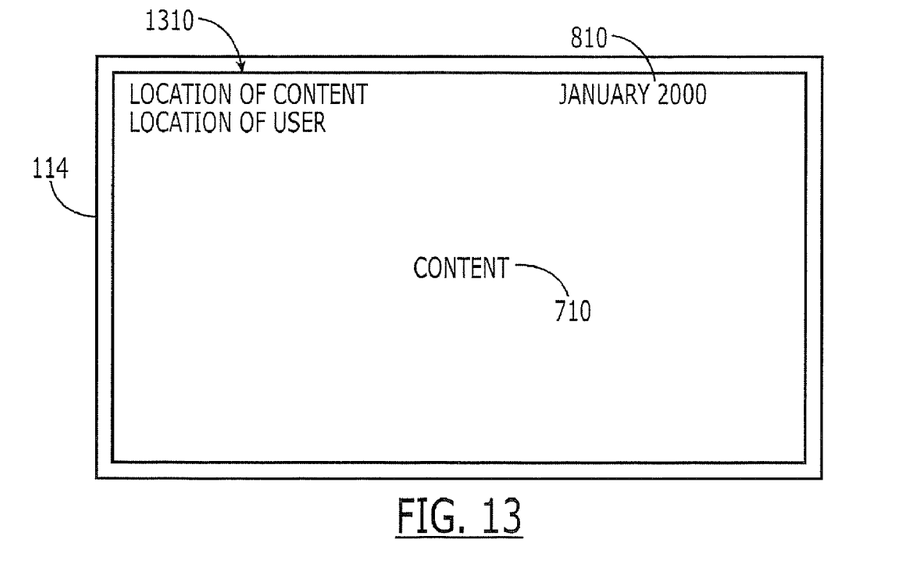

FIG. 13 illustrates other embodiments wherein an indication of a geographic location 1310 is also added. The geographic location may correspond to a location of the content 710 and/or the location of the user of the content player 110. For example, the content 710 may relate to a news item concerning New York City. The user may select the location of the content 1310, and a current events guide 1110 of FIG. 11 may automatically display newspapers from New York City from the previous time 810. Alternatively, an electronic program guide 1010 of FIG. 10 may automatically display a guide for television stations in New York City at the previous time 810. Alternatively, the location of the user may be selected so that the current events guide 1110 and/or electronic program guide 810 may be automatically provided relative to the current location of the user rather than the location of the content 710. Again, the location information 1310 may be provided as a frame, window and/or overlay. In still other embodiments, yet another location may be selected that is not the location of the content or the location of the user. For example, the location may be the location where the user lived as a child, identified by a zip code, city name, etc., so that the user can relate the content 710 to events that were actually happening in the user's life at the time. Other locations may also be provided, automatically and/or by user selection.

Embodiments that were described above in connection with FIGS. 8-13 provided a publication date 810 as a time, day, month and/or year. However, other visual but non-alphanumeric indications of a previous time may be provided according to other embodiments. In some embodiments, a first type of indication of a previous time may be provided if the previous time is before a given time, and a second type of indication may be provided if the previous time is after a given time. Thus, for example, a red frame 720 may indicate content that is less than one year old, a black frame 720 may indicate content that is between one and ten years old, and a gray frame 720 may indicate content that is more than ten years old. In other embodiments, the resolution of the display may be changed to automatically provide lower resolution for older content. In yet other embodiments, grain, noise or other distortion artifacts may be added as a function of age of the content. Thus, the indication need not be an alphanumeric indication, but, rather, may be a symbol or other modification to the frame, overlay and/or to the content itself to indicate the age of the content.

Figure 14:
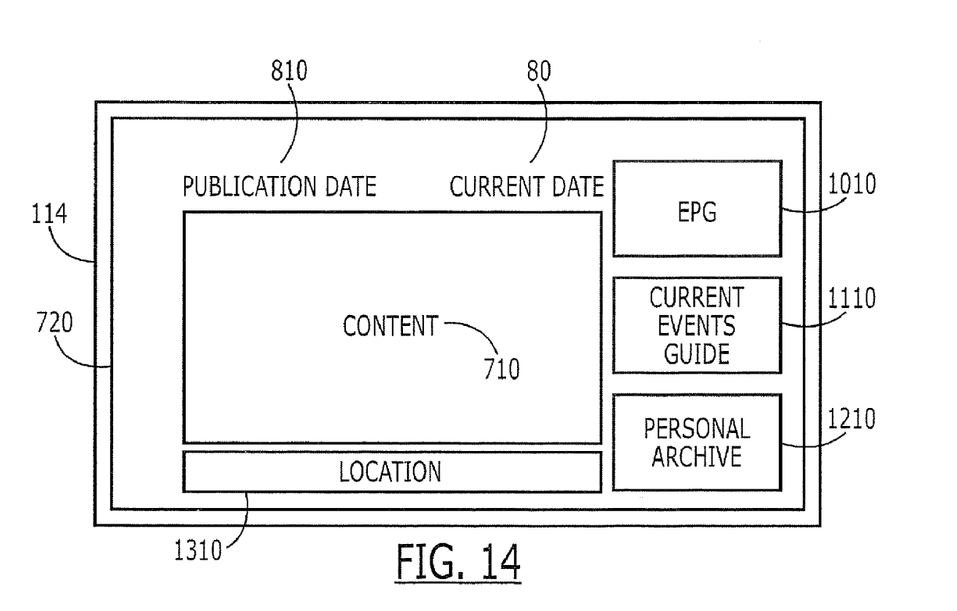

Moreover, FIGS. 7-13 illustrate user interfaces in which various embodiments of an indication of a previous time in which a content was previously published are separately illustrated. However, any of the embodiments of FIGS. 7-13 may be used together in various subcombinations and in combination. Thus, for example, FIG. 14 illustrates a user interface in which the content 710 is displayed along with a frame 720 that includes the previous publication date 810, the current date 820, an EPG 1010 for the publication date, a current events guide 1110 for the publication date, a personal archive 1210 for the publication date, and a location identification 1310, according to various embodiments that were described above. Various subcombinations of these features may also be provided in other embodiments.

Embodiments have been described above primarily in connection with visual displays of information. However, other embodiments may be applied to audio-only displays. For example, an indication of a previous time in which the content was previously published may be provided by adding crackling or static noises prior to, after, during gaps of and/or during playback of old audio content, such as old radio programs. Moreover, a voice-synthesized announcement of a timestamp may be provided before, during and/or after the audio playback. In other embodiments, the audio playback may be provided on an audiovisual display, so that the visual embodiments described above may be provided in connection with audio-only content.

Embodiments may be selectively enabled or disabled. Thus, for example, embodiments may be automatically activated when playing back previously recorded content from a digital video recorder, so as to reduce or avoid confusion as to whether the "current events" mentioned in the played back content are really current or are only current events relative to the publication time of the recorded content. However, in other instances, embodiments may be disabled when playing back old content. For example, when playing back a selected old song, the user may not need to be reminded that it is an old song, and may find some embodiments to be distracting. On the other hand, a user playing an old song may wish to be provided with a Top Ten list of other recordings from that time period and/or a current events list, so that embodiments may be enabled.

Additional discussion of various embodiments will now be provided. In particular, there continues to be a proliferation of content that is available to consumers, and the line between current content and older content may be difficult to readily distinguish. Moreover, it may be difficult for users to obtain a historical and/or personal context when viewing older content. Embodiments can add information to content that can provide an indication that it is previously published content rather than live content. For example, when viewing a television program from a digital video recorder, many of the references in the program may not make sense to the user unless the user is provided with a context as to the previously published content. The context that is added may range from simple to complex. For example, a "time machine" frame 720 may be added to signify previously published content, whereas absence of a time machine frame may signify current broadcasts. Various different types of frames may be provided to indicate how far back in time the broadcast occurred and/or to provide an ambience around the broadcast to symbolize the era in which the content was previously published. More complex indications may provide an alphanumeric indication 810 of the previous time in which the content was previously published, and may also provide a rendering of an electronic program guide 1010 as of the previous time that was indicated. Thus, a user can browse other content from a given era using the electronic program guide 1010, and thereby manage archived material.

In other embodiments, a current events window 1110 may also be provided that uses one or more sources from the previous time in which the content was previously published. The current events source may be content-sensitive. For example, if an old news broadcast is being viewed, current events related to news may be provided, whereas if an old sports program is being viewed, current events sport news for the previous time may be provided. In yet another example, if an old recording is being listened to and/or an old movie is being watched, other Top Ten recordings from that era and/or Top Ten movies from that era may be listed in the current events guide 1110. Moreover, personal archives 1210 may be provided, so that a user can be reminded of what the user was doing, what the user looked like, etc., at the time that the given content was originally published.

Accordingly, embodiments can provide an ambience and/or historical context for the time in which the content was previously published, while playing back the previously published content. A mechanism for further inquiry as to related content from a given time frame may thereby be provided. Moreover, user confusion as to whether current content or archived content is being played back may be reduced or eliminated. Time-shifted content may, therefore, be indicated. In other embodiments, navigation for multiple time frames may be provided, for example using the current events and/or electronic program guide, by providing for navigation by the publication date, five years earlier, ten years earlier, five years later, ten years later, etc. Still other embodiments can add other metadata related to the content that is being displayed. Thus, the window, frame and/or overlay may indicate "Season 2 of Seinfield" to provide another indication as to context.

As was noted above, various layers of context may be provided according to various embodiments. A simple context may provide an indication that a given broadcast is old. A more complex context may indicate how old. An even more complex context may provide an indication as to what else was happening in the world at that time, what else was playing in a given media at that time and/or other information related to the timeframe of the content. Moreover, a navigation bar as to other times may be provided, which can allow the user to navigate to other times of interest and reset the EPG current events guide 1110 and personal archive 1210 to mirror the other time that was navigated. Similarly, a user can navigate to a given location 1310 and reset the EPG 1010, current events guide 1110 and/or personal archive 1210 relative to the location 1310. The location 1310 can be based upon the location of the content or the location of the user.

Accordingly, some embodiments can allow a user of content to go back in time and obtain other useful content related to the given time. A "media time machine" may thereby be provided that can provide an immersive experience for a time that a given piece of content was originally published. Some embodiments may replace the packaging that was created with physical media, such as liner notes that accompanied a record album or information on a DVD box.

In the drawings and specification, there have been disclosed embodiments and, although specific terms are employed, they are used in a generic and descriptive sense only and not for purposes of limitation, the scope of the invention being set forth in the following claims.

What is claimed is:

1. A method of playing back previously published content comprising:
   identifying an age of the previously published content; and
   automatically adding distortion to the previously published content as a function of the age of the previously published content, so as to provide a visual but non-alphanumeric indication of the age of the previously published content while playing back the previously published content.

2. The method according to claim 1 further comprising automatically adding a timestamp of a previous time in which the content was previously published, while playing back the previously published content.

3. The method according to claim 1 further comprising automatically adding an indication of a geographic location of a user who is playing back the previously published content while playing back the previously published content.

4. The method according to claim 1 wherein the distortion comprises grain.

5. The method according to claim 1 wherein the distortion comprises noise.

6. The method according to claim 1 wherein the distortion comprises a decrease in resolution.

7. A tangible computer-readable storage medium having computer-readable program code embodied therein, the computer-readable program code when executed being configured to cause the computer to perform a method of playing back previously published content comprising:

identifying an age of the previously published content; and automatically adding distortion to the previously published content as a function of the age of the previously published content, so as to provide a visual but non-alphanumeric indication of the age of the previously published content while playing back the previously published content.

* * * * *